United States Patent
Chiang et al.

(10) Patent No.: US 12,007,651 B2
(45) Date of Patent: Jun. 11, 2024

(54) VIRTUAL REALITY DISPLAY

(71) Applicant: HTC Corporation, Taoyuan (TW)

(72) Inventors: Che-Wen Chiang, Taoyuan (TW); Po-Sen Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/304,374

(22) Filed: Apr. 21, 2023

(65) Prior Publication Data

US 2023/0408870 A1    Dec. 21, 2023

Related U.S. Application Data

(60) Provisional application No. 63/353,634, filed on Jun. 20, 2022.

(51) Int. Cl.
| | |
|---|---|
| G02F 1/13363 | (2006.01) |
| G02B 27/01 | (2006.01) |
| G02F 1/1335 | (2006.01) |
| G02F 1/139 | (2006.01) |

(52) U.S. Cl.
CPC ... G02F 1/133638 (2021.01); G02B 27/0172 (2013.01); G02F 1/133536 (2013.01); G02F 1/133555 (2013.01); G02F 1/1396 (2013.01); G02B 2027/0127 (2013.01); G02F 2413/02 (2013.01)

(58) Field of Classification Search
CPC ......... G02F 1/133638; G02F 1/133536; G02F 1/133555; G02F 1/1396; G02F 2413/02; G02B 27/0172; G02B 2027/0127
See application file for complete search history.

(56) References Cited

U.S. PATENT DOCUMENTS

2021/0263318 A1*   8/2021   Lee ..................... G02B 27/286
2021/0271082 A1*   9/2021   Smith .................. G02B 5/3083

FOREIGN PATENT DOCUMENTS

| CN | 112051675 | 12/2020 |
|---|---|---|
| TW | M615839 | 8/2021 |

OTHER PUBLICATIONS

"Office Action of Taiwan Counterpart Application", issued on Mar. 19, 2024, p. 1-p. 6.

* cited by examiner

*Primary Examiner* — James A Dudek
(74) *Attorney, Agent, or Firm* — JCIPRNET

(57) ABSTRACT

A virtual reality display includes a display module and an optical module. The display module includes a display, a liquid crystal cell, a first phase retarder, and a polarizing directional lens. The optical module includes a transflective lens, a second phase retarder, a reflective polarizer, and a lens element. The liquid crystal cell is located between the display and the first phase retarder, and the polarizing directional lens is located between the first phase retarder and the transflective lens. The transflective lens is located between the polarizing directional lens and the second phase retarder, and the reflective polarizer is located between the second phase retarder and the lens element.

11 Claims, 6 Drawing Sheets

VIRTUAL REALITY DISPLAY

CROSS-REFERENCE TO RELATED APPLICATION

This application claims the priority benefit of U.S. provisional application Ser. No. 63/353,634, filed on Jun. 20, 2022. The entirety of the above-mentioned patent application is hereby incorporated by reference herein and made a part of this specification.

BACKGROUND

Technical Field

The invention relates to a display, and in particular, to a virtual reality display.

Description of Related Art

Technologies such as augmented reality (AR), virtual reality (VR) or mixed reality (MR) may provide users with display images close to real scene experiences, which have attracted extensive attentions in recent years.

However, regarding current AR, VR or MR display devices, in addition to reducing a weight of the device itself to reduce a burden on a wearer, how to further reduce user's vergence-accommodation conflict (VAC) to alleviate fatigue and dizziness of the user is also a problem that relevant manufacturers still need to solve.

SUMMARY

The invention is directed to a virtual reality display, which increases a spatial depth of images, achieves an effect of reducing VAC, alleviates fatigue and dizziness of a user, and enhances user experience.

An embodiment of the invention provides a virtual reality display including a display module and an optical module. The display module includes a display, a liquid crystal cell, a first phase retarder and a polarizing directional lens. The optical module includes a transflective lens, a second phase retarder, a reflective polarizer and a lens element. The liquid crystal cell is arranged between the display and the first phase retarder, the polarizing directional lens is disposed between the first phase retarder and the transflective lens. The transflective lens is disposed between the polarizing directional lens and the second phase retarder, and the reflective polarizer is disposed between the second phase retarder and the lens element. The lens element is disposed between the reflective polarizer and a target area.

Another embodiment of the invention provides a virtual reality display including a display module and an optical module. The display module includes a display and a first phase retarder. The optical module includes a transflective lens, a second phase retarder, a reflective polarizer, a liquid crystal cell, a third phase retarder, a polarizing directional lens and a lens element. The first phase retarder is disposed between the display and the optical module. The transflective lens is disposed between the first phase retarder and the second phase retarder. The second phase retarder is disposed between the transflective lens and the reflective polarizer. The reflective polarizer is disposed between the second phase retarder and the liquid crystal cell. The liquid crystal cell is disposed between the reflective polarizer and the third phase retarder. The third phase retarder is disposed between the liquid crystal cell and the polarizing directional lens. The lens element is disposed between the polarizing directional lens and a target area.

Based on the above description, the virtual reality display of the invention uses the liquid crystal cell to switch between different linear polarization states, and adopts the optical module to make use of transformation of linear polarization and circular polarization to implement back and forth transmission of an optical path, and uses the polarizing directional lens to produce different focal lengths corresponding to different circular polarizations. While achieving a thin and light design of the optical module, image depths at different focal lengths are further provided. To increase a space depth of a virtual image to reduce the VAC may effectively alleviate the fatigue and dizziness of the user using the virtual reality display.

DESCRIPTION OF THE EMBODIMENTS

Figure 1A:
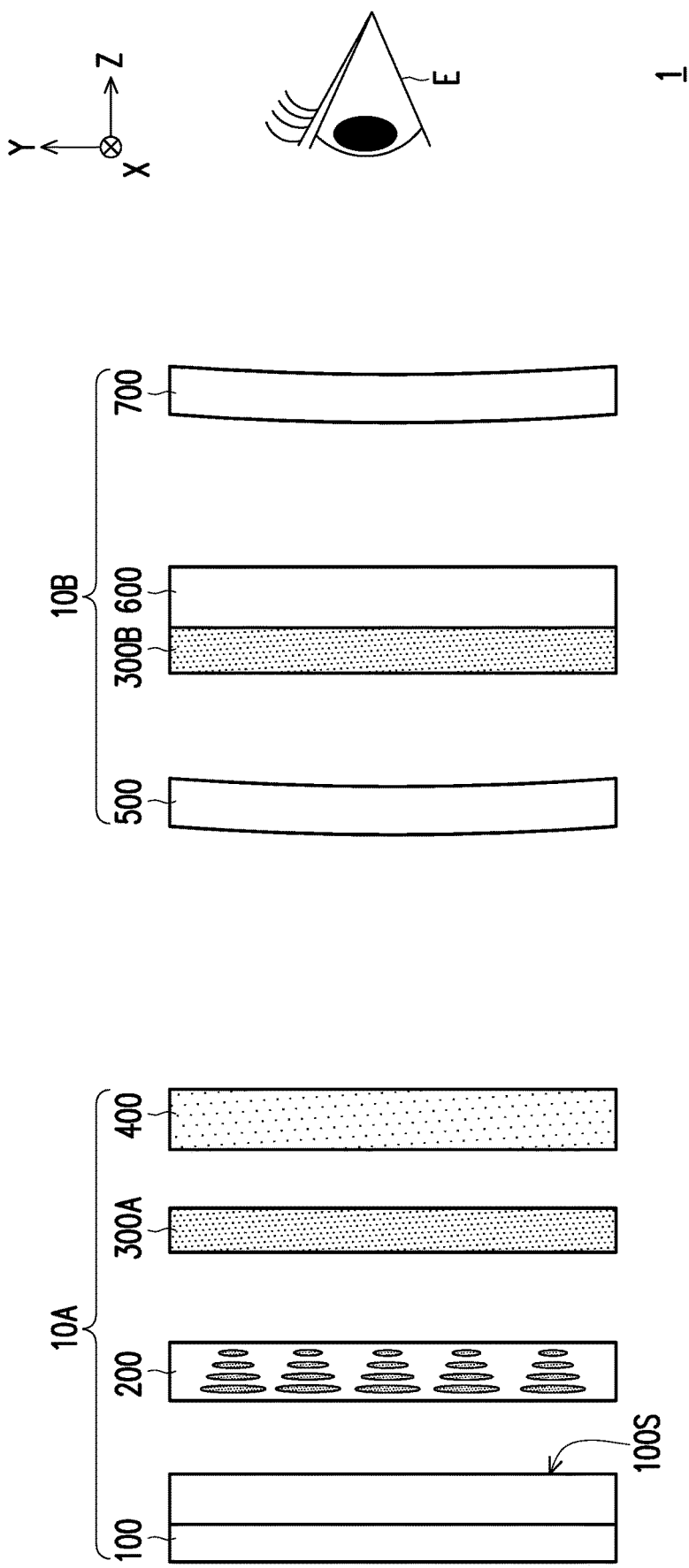
FIG. 1A is a schematic cross-sectional view of a virtual reality display according to a first embodiment of the invention.

FIG. 1A is a schematic cross-sectional view of a virtual reality display according to a first embodiment of the invention. Referring to FIG. 1A, a virtual reality display 1 includes a display module 10A and an optical module 10B. The display module 10A includes a display 100, a liquid crystal cell 200, a first phase retarder 300A and a polarizing directional lens 400. The optical module 10B includes a transflective lens 500, a second phase retarder 300B, a reflective polarizer 600 and a lens element 700. The liquid crystal cell 200 is disposed between the display 100 and the first phase retarder 300A, and the polarizing directional lens 400 is disposed between the first phase retarder 300A and the transflective lens 500. The transflective lens 500 is disposed between the polarizing directional lens 400 and the second phase retarder 300B, and the reflective polarizer 600 is disposed between the second phase retarder 300B and the lens element 700. The lens element 700 is disposed between the reflective polarizer 600 and a target area.

The display 100 has a display surface 100S for emitting display light L to the target area (such as a human eye E in FIG. 1A). The display 100 is, for example, a liquid crystal display (LCD) or other suitable display devices. It should be noted that the display light L in the embodiment is linearly polarized light, which, for example, has a first polarization state L1 parallel to a direction Y and perpendicular to a direction X, but the invention is not limited thereto. For example, if a light-emitting diode display with a non-polarized light source is used as the display 100, it is only required to configure an additional linear polarizer as the display surface 100S to convert non-polarized light into linearly polarized light.

The liquid crystal cell 200 is disposed outside the display 100. Further, the liquid crystal cell 200 is disposed on one side of the display surface 100S for receiving the display light L and changing a polarization state of the display light L. For example, the liquid crystal cell 200 may be a twisted nematic liquid crystal array. When the liquid crystal cell 200 is in a turn-off state, it may twist the display light L from the first polarization state L1 parallel to the direction Y by 90 degrees to a second polarization state L2 parallel to the direction X. When the liquid crystal cell 200 is in a turn-on state, the polarization state of the display light L is not affected by the liquid crystal cell 200, but the invention is not limited thereto.

The first phase retarder 300A and the second phase retarder 300B may be made of uniaxial crystal. In the embodiment, the first phase retarder 300A and the second phase retarder 300B may be quarter-wave plates. It should be understood that a purpose of configuring the first phase retarder 300A and the second phase retarder 300B is to transform the display light L from a linear polarization state to a circular polarization state, or to transform the circular polarization state into the linear polarization state. Therefore, the first phase retarder 300A and the second phase retarder 300B may also adopt a single or a plurality of elements capable of achieving the same optical effect as an alternative to the quarter-wave plate, which is not limited by the invention.

The polarizing directional lens 400 may have different refractive powers for incident light of different circular polarization states. For example, the polarizing directional lens 400 has a positive focal length (f>0) for incident light with right-handed circular polarization (RHCP). In other words, when the RHCP light is incident to the polarizing directional lens 400, it may be converged. Conversely, the polarizing directional lens 400 has a negative focal length (f<0) for incident light with left-handed circular polarization (LHCP). In other words, when the LHCP light is incident to the polarizing directional lens 400, it may be diverged.

The transflective lens 500 may be a beam splitter, or a 50/50 mirror, i.e., 50% of the incident light is transmitted and 50% of the incident light is reflected. The transflective lens 500 may be made by coating a semi-reflective material on one side of a lens, but the invention is not limited thereto.

The reflective polarizer 600 may reflect the light of the first linear polarization state and allow the light of the second linear polarization state to pass through, where the first linear polarization state and the second linear polarization state differ by 90 degrees in a polarization plane. For example, the first linear polarization state L1 of the embodiment is, for example, parallel to the direction Y, the second linear polarization state L2 is, for example, parallel to the direction X, and a transmission axis of the reflective polarizer 600 is, for example, parallel to the direction X, so that it may reflect the light of the first linear polarization state L1 and allow the light of the second linear polarization state L2 to pass through, but the invention is not limited thereto.

A material of the lens element 700 may be a common optical lens material such as glass or plastic, and the lens element 700 may be a single lens or a combination of multiple lenses, which is not limited by the invention.

Figure 1B:
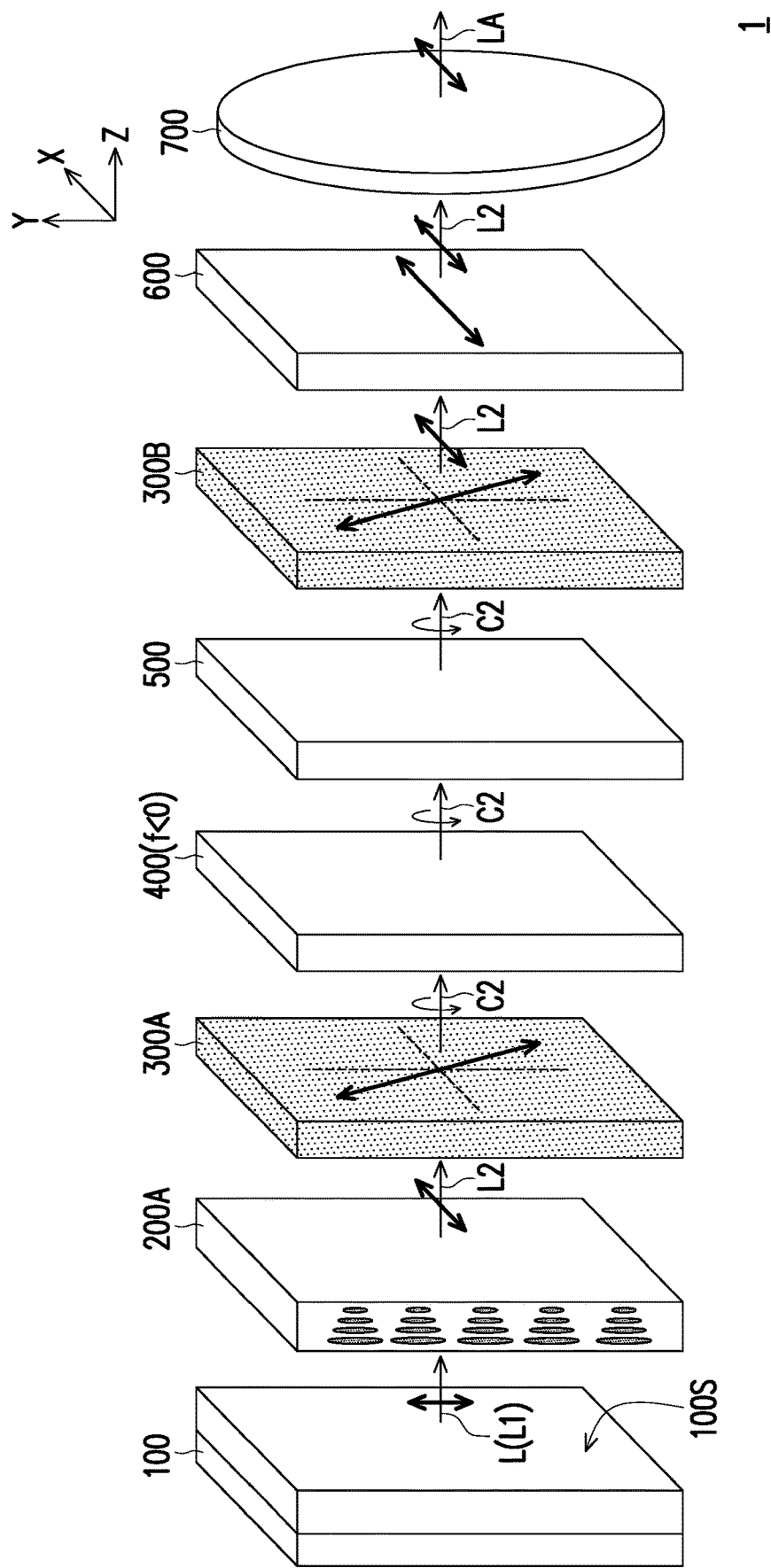
FIG. 1B is a schematic diagram of polarization changes of a display light passing through each element when the virtual reality display of the first embodiment of FIG. 1A is in a first state.
Figure 1C:
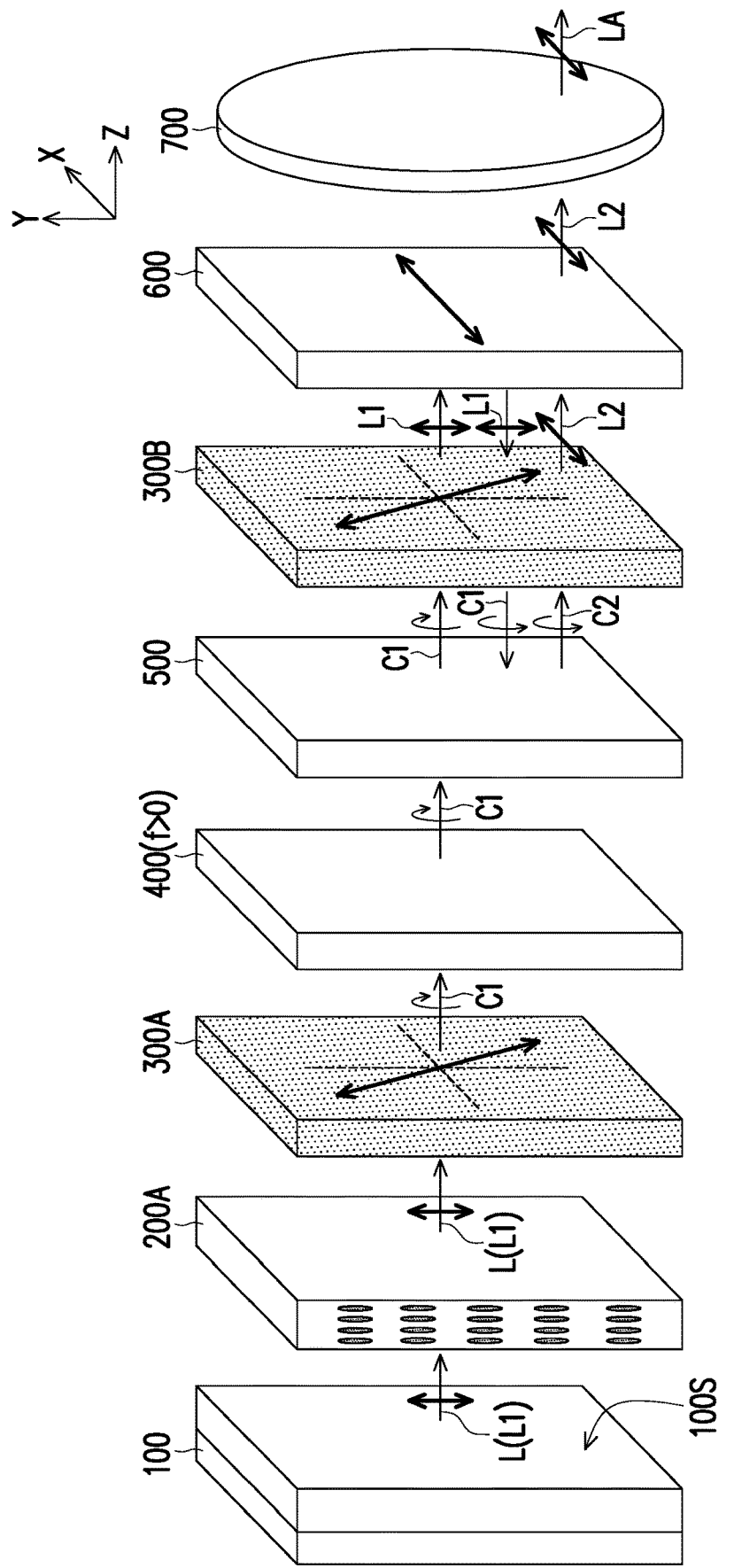
FIG. 1C is a schematic diagram of polarization changes of a display light passing through each element when the virtual reality display of the first embodiment of FIG. 1A is in a second state.

FIG. 1B is a schematic diagram of polarization changes of a display light passing through each element when the virtual reality display of the first embodiment of FIG. 1A is in a first state. FIG. 1C is a schematic diagram of polarization changes of a display light passing through each element when the virtual reality display of the first embodiment of FIG. 1A is in a second state. Examples are provided below to describe optical principles of the virtual reality display 1 of the embodiment. For the convenience of description and presentation, a direction Z in the following embodiments is, for example, a propagating direction of the display light L, the first linear polarization state L1 is, for example, vertical linear polarization in the direction Y, and the second linear polarization state L2 is, for example, horizontal linear polarization in the direction X, where the direction X, the direction Y, and the direction Z are substantially perpendicular to each other. The first circular polarization state C1 is, for example, the RHCP, and the second circular polarization state C2 is, for example, the LHCP. Certainly, the invention is not limited thereto.

Referring to FIG. 1B first, when the liquid crystal cell 200 is in a first state 200A of the turn-off state, the display light L has the first linear polarization state L1 when being emitted from the display 100, and is transformed into the second linear polarization state L2 after passing through the liquid crystal cell 200; and is further transformed into the second circular polarization state C2 after passing through the first phase retarder 300A, and is diverged (f<0) after passing through the polarizing directional lens 400; after passing through the transflective lens 500, the display light L is further transformed into the second linear polarization state L2 by the second phase retarder 300B, so that it may pass through the reflective polarizer 600. Finally, the display light L is transmitted to the human eye E through the lens element 700 to generate a first focal length image. At this time, the first focal length image generated in the first state 200A has a light intensity LA.

Referring to FIG. 1C, when the liquid crystal cell 200 is in a second state 200B of the turn-on state, the display light L has the first linear polarization state L1 when being emitted from the display 100, and is maintained the first linear polarization state L1 after passing through the liquid crystal cell 200; and is further transformed into the first circular polarization state C1 after passing through the first phase retarder 300A, and is converged (f>0) after passing through the polarizing directional lens 400; after passing through the transflective lens 500, the display light L is further transformed into the first linear polarization state L1 by the second phase retarder 300B, and is then reflected by the reflective polarizer 600 and maintain the first linear polarization state L1. Then, the display light L is transformed into the first circular polarization state C1 after again passing through the second phase retarder 300B, and is further transformed into the second circular polarization state C2 after being reflected by the transflective lens 500, and is further transformed into the second linear polarization state L2 after passing through the second phase retarder 300B, so that the display light L may pass through the reflective polarizer 600. Finally, the display light L is transmitted to the human eye E through the lens element 700 to generate a second focal length image. At this time, the second focal length image generated in the second state 200B has a light intensity LB.

In overall, through the above embodiments, when the liquid crystal cell 200 is in the first state 200A, an image formed by the display light L may have a first focal length; and in the second state 200B, the image formed by the display light L may have a second focal length. Therefore, the virtual reality display 1 may provide images of different focal lengths in different states, while using the optical module 10B to achieve a light and thin design of the wearable device, it further provides image depths of different focal lengths. To increase a space depth of a virtual image to reduce the VAC may effectively alleviate fatigue and dizziness of the user using the virtual reality display 1.

On the other hand, a switching frequency of the first state 200A and the second state 200B of the liquid crystal cell 200 may be greater than or equal to 240 Hz and less than or equal to 1000 Hz. Through time-slicing, the first focal length image of the first state 200A and the second focal length image of the second state 200B are fused into a display image with an image depth in observation of the human eye E.

It is should be noted that, since in the first state 200A, the display light L is reflected by the transflective lens 500 for once, the formed first focal length image has the light intensity LA. While in the second state 200B, the display light L is reflected by the transflective lens 500 for twice, and the formed second focal length image has the light intensity LB. Therefore, a magnitude of the light intensity LA is twice of a magnitude of the light intensity LB.

In some embodiments, the display 100 may be adjusted to have a first brightness in the first state 200A, and the display 100 may be adjusted to have a second brightness in the second state 200B, and the first brightness is a half of the second brightness. In this way, the display light L in the first state 200A is reflected by the transflective lens 500 for once, and the display light L in the second state 200B is reflected by the transflective lens 500 for twice, and the magnitude of the light intensity LA may be equal to the magnitude of the light intensity LB.

For example, if the brightness of the display 100 is 50% in the first state 200A, after reflection of the transflective lens 500 for once, the light intensity LA is approximately 25%. If the brightness of the display 100 is 100% in the second state 200B, after reflections of the transflective lens 500 for twice, the light intensity LB is also approximately 25%. In this way, light output efficiency of the first state 200A and the second state 200B may be kept consistent, so as to enhance the user's viewing experience.

Another embodiment will be provided below to describe the invention in detail, where the same components will be marked with the same symbols, and the description of the same technical content will be omitted. Please refer to the foregoing embodiments for the omitted parts, and detail thereof is not repeat hereafter.

Figure 2A:
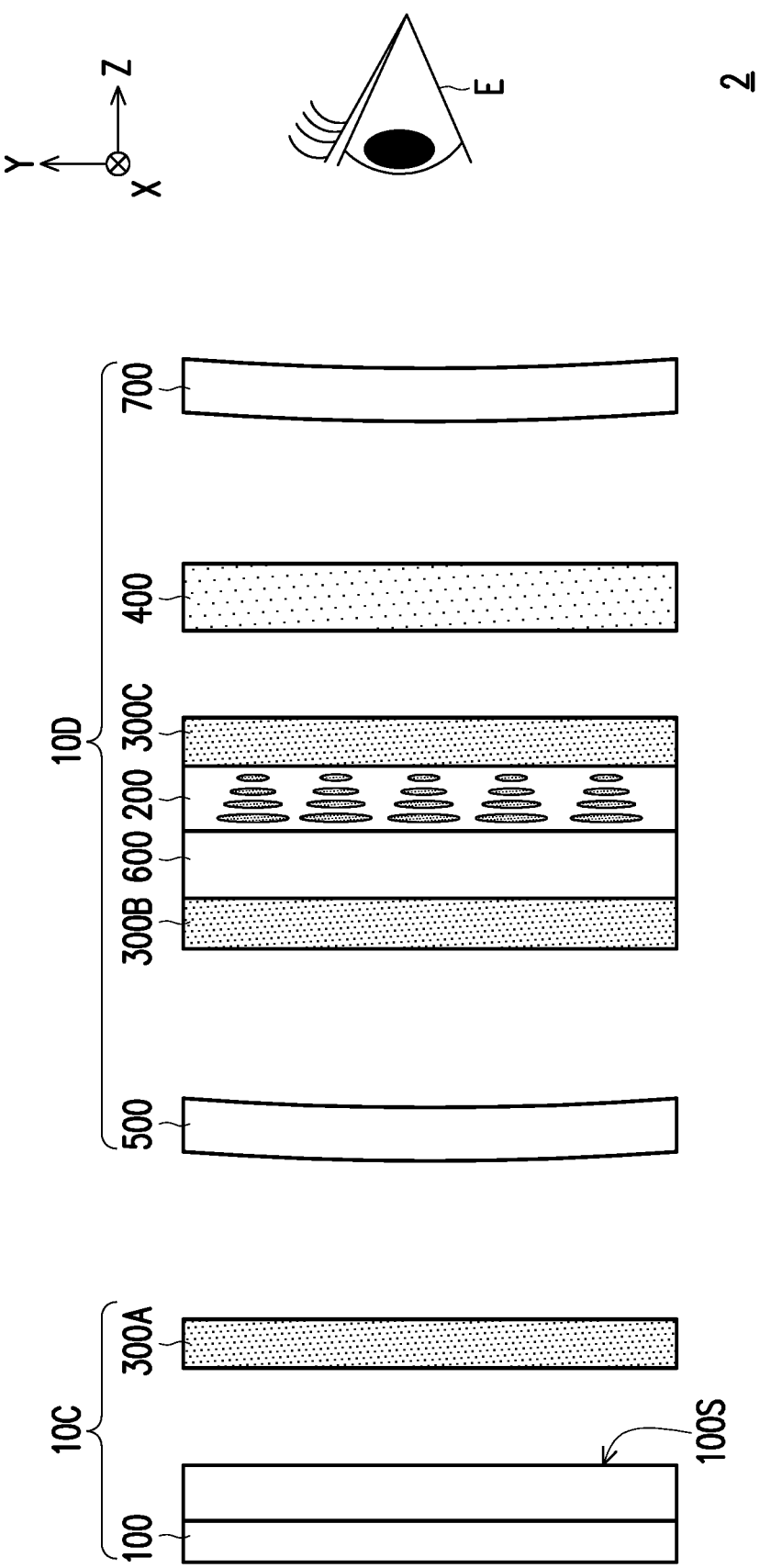
FIG. 2A is a schematic cross-sectional view of a virtual reality display according to a second embodiment of the invention.

FIG. 2A is a schematic cross-sectional view of a virtual reality display according to a second embodiment of the invention. Referring to FIG. 2A, main differences between a virtual reality display 2 of the embodiment and the virtual reality display 1 of FIG. 1A are that placement positions of the liquid crystal cell 200 and the polarizing directional lens 400 are different, and an optical module 10D further includes a third phase retarder 300C, and the third phase retarder 300C may adopt the same design or the same material as that of the aforementioned first phase retarder 300A and second phase retarder 300B, which will not be repeated here.

In detail, a display module 10C includes the display 100 and the first phase retarder 300A. The optical module 10D includes the transflective lens 500, the second phase retarder 300B, the reflective polarizer 600, the liquid crystal cell 200, the third phase retarder 300C, the polarizing directional lens 400 and the lens element 700. The first phase retarder 300A is located between the display 100 and the optical module 10D, the transflective lens 500 is disposed between the first phase retarder 300A and the second phase retarder 300B, and the second phase retarder 300B is disposed between the transflective lens 500 and the reflective polarizer 600. The reflective polarizer 600 is disposed between the second phase retarder 300B and the liquid crystal cell 200, and the liquid crystal cell 200 is disposed between the reflective polarizer 600 and the third phase retarder 300C. The third phase retarder 300C is disposed between the liquid crystal cell 200 and the polarizing directional lens 400, and the lens element 700 is disposed between the polarization directional lens 400 and the target area (for example, the human eye E in FIG. 2A).

Figure 2B:
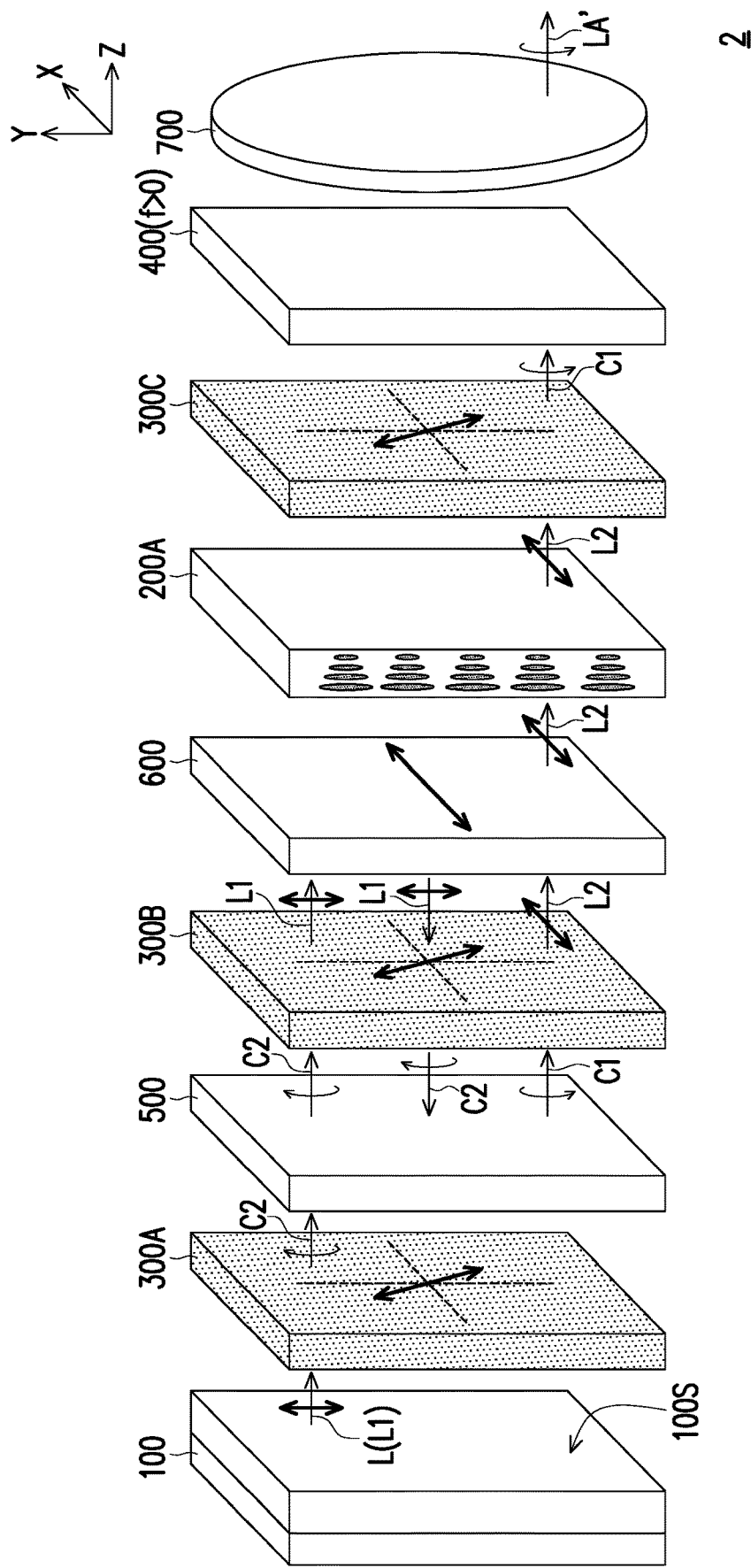
FIG. 2B is a schematic diagram of polarization changes of a display light passing through each element when the virtual reality display of the second embodiment of FIG. 2A is in a first state.
Figure 2C:
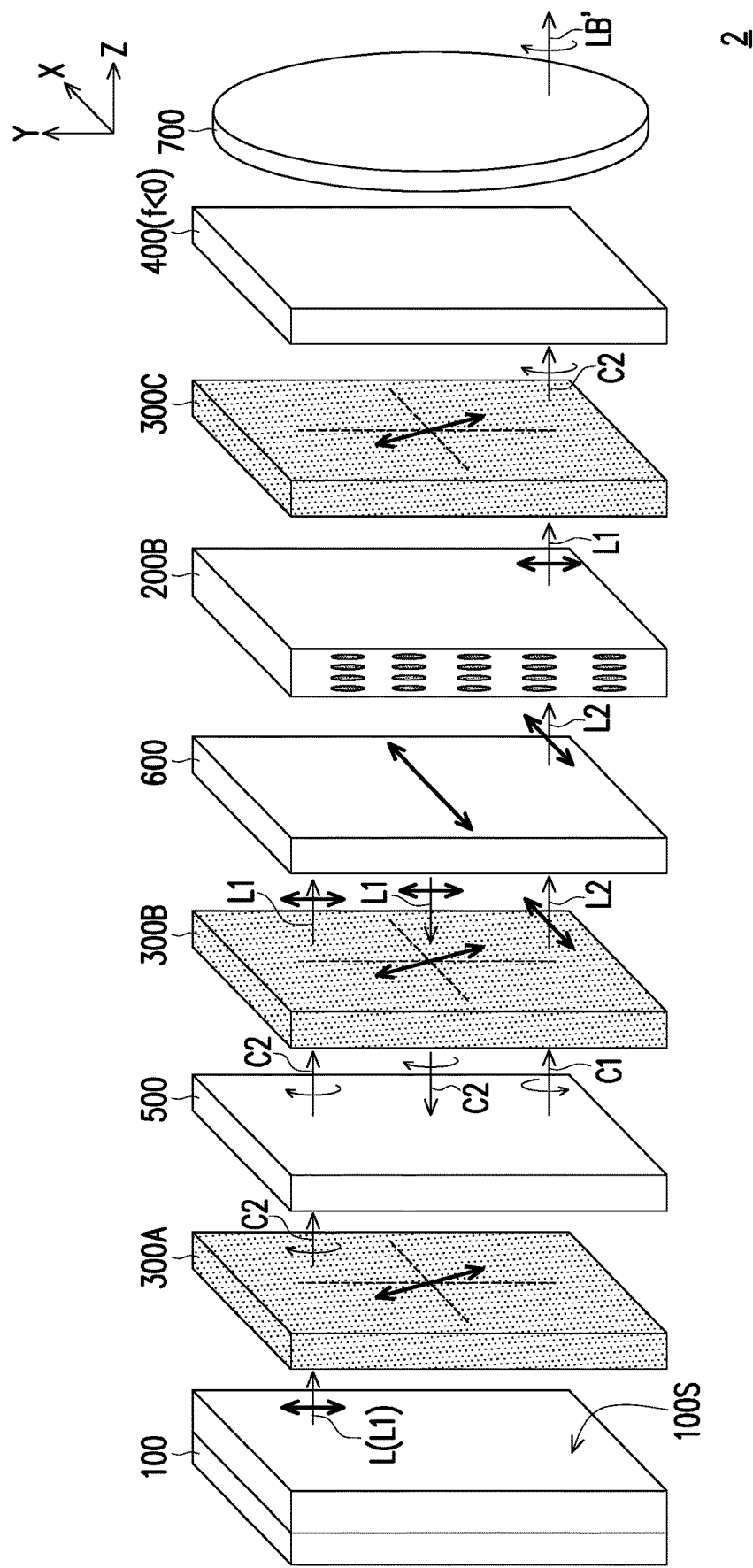
FIG. 2C is a schematic diagram of polarization changes of the display light passing through each element when the virtual reality display of the second embodiment of FIG. 2A is in a second state.

FIG. 2B is a schematic diagram of polarization changes of a display light passing through each element when the virtual reality display of the second embodiment of FIG. 2A is in a first state. FIG. 2C is a schematic diagram of polarization changes of the display light passing through each element when the virtual reality display of the second embodiment of FIG. 2A is in a second state. Examples are provided below to describe optical principles of the virtual reality display 2 of the embodiment.

Referring to FIG. 2B first, when the liquid crystal cell 200 is in the first state 200A of the turn-off state, the display light L has the first linear polarization state L1 when being emitted from the display 100, and is transformed into the second circular polarization state C2 after passing through the first phase retarder 300A; and is further transformed into the first linear polarization state L1 by the second phase retarder 300B after passing through the transflective lens 500, and maintains the first linear polarization state L1 after being reflected by the reflective polarizer 600; the display light L is transformed into the second circular polarization state C2 after again passing through the second phase retarder 300B, and is transformed into the first circular polarization state C1 after being reflected by the transflective lens 500, and is further transformed into the second linear polarization state L2 by the second phase retarder 300B, so that it may pass through the reflective polarizer 600; the display light L maintains the second linear polarization state L2 after passing through the liquid crystal cell 200, and is transformed into the first circular polarization state C1 by the third phase retarder 300C, and is converged (f>0) after passing through the polarizing directional lens 400; and finally the display light L is transmitted to the human eye E through the lens element 700 to generate a first focal length image. At this time, the first focal length image generated in the first state 200A has a light intensity LA'.

Referring to FIG. 2C, since the polarization changes of the display light L emitted from the display 100 to transformation of the second linear polarization state L2 to pass through the reflective polarizer 600 are all the same as those in FIG. 2B, details thereof may be deduced by referring to the aforementioned description, and differences there between are that when the liquid crystal cell 200 is in the second state 200B of the turn-on state, the display light L is transformed into the first linear polarization state L1 after passing through the liquid crystal cell 200, and is transformed into the second circular polarization state C2 by the third phase retarder 300C, and is diverged after passing through the polarizing directional lens 400 (f<0). Finally, the display light L is transmitted to the human eye E through the lens element 700 to generate a second focal length image. At this time, the second focal length image generated in the second state 200B has a light intensity LB'.

Since the first focal length image and the second focal length image are all reflected twice by the transflective lens 500, the light intensity LA' and the light intensity LB' are substantially the same. In this way, the light output efficiency of the first state 200A and the second state 200B may be kept consistent, so as to enhance the user's viewing experience.

In summary, the virtual reality display of the invention uses the liquid crystal cell to switch between different linear polarization states, and adopts the optical module to make use of transformation of linear polarization and circular polarization to implement back and forth transmission of an optical path, and uses the polarizing directional lens to produce different focal lengths corresponding to different circular polarizations. While achieving a thin and light design of the optical module, image depths at different focal lengths are further provided. To increase a space depth of a virtual image to reduce the VAC may effectively alleviate fatigue and dizziness of the user using the virtual reality display.

What is claimed is:

1. A virtual reality display, comprising a display module and an optical module, wherein the display module comprises:
   a display, configured to emit display light to a target area;
   a liquid crystal cell, receiving the display light;
   a first phase retarder, wherein the liquid crystal cell is disposed between the display and the first phase retarder; and
   a polarizing directional lens, disposed between the first phase retarder and the optical module, wherein the optical module comprises:
   a transflective lens;
   a second phase retarder, wherein the transflective lens is disposed between the polarizing directional lens and the second phase retarder;
   a reflective polarizer, disposed between the target area and the second phase retarder; and
   a lens element, disposed between the reflective polarizer and the target area.

2. The virtual reality display according to claim 1, wherein the display light has a first linear polarization state, the liquid crystal cell is adapted to transform the display light from the first linear polarization state to a second linear polarization state, the first phase retarder is adapted to transform the first linear polarization state to a first circular polarization state and transform the second linear polarization state to a second circular polarization state, and the polarizing directional lens respectively has a positive focal length and a negative focal length for the first circular polarization state and the second circular polarization state.

3. The virtual reality display according to claim 1, wherein the liquid crystal cell has a first state and a second state, an image formed by the display light has a first focal length in the first state, and the image formed by the display light has a second focal length in the second state.

4. The virtual reality display according to claim 3, wherein a switching frequency of the first state and the second state is greater than or equal to 240 Hz and less than or equal to 1000 Hz.

5. The virtual reality display according to claim 3, wherein the display has a first brightness in the first state, the display has a second brightness in the second state, and the first brightness is a half of the second brightness.

6. The virtual reality display according to claim 1, wherein the liquid crystal cell comprises a twisted nematic liquid crystal array.

7. A virtual reality display, comprising a display module and an optical module, wherein the display module comprises:
   a display, configured to emit display light to a target area; and
   a first phase retarder, disposed between the display and the optical module, wherein the optical module comprises:
   a transflective lens;
   a second phase retarder, wherein the transflective lens is disposed between the first phase retarder and the second phase retarder;
   a reflective polarizer, wherein the second phase retarder is disposed between the transflective lens and the reflective polarizer;
   a liquid crystal cell, wherein the reflective polarizer is disposed between the second phase retarder and the liquid crystal cell;
   a third phase retarder, wherein the liquid crystal cell is disposed between the reflective polarizer and the third phase retarder;
   a polarizing directional lens, wherein the third phase retarder is disposed between the liquid crystal cell and the polarizing directional lens; and
   a lens element, disposed between the polarizing directional lens and the target area.

8. The virtual reality display according to claim 7, wherein the display light has a first linear polarization state, the liquid crystal cell is adapted to transform the display light from the first linear polarization state to a second linear polarization state, the first phase retarder, the second phase retarder, and the third phase retarder are adapted to transform the display light between the first linear polarization state and a first circular polarization state and adapted to transform the display light between the second linear polarization state and a second circular polarization state, and the polarizing directional lens respectively has a positive focal length and a negative focal length for the first circular polarization state and the second circular polarization state.

9. The virtual reality display according to claim 7, wherein the liquid crystal cell has a first state and a second state, an image formed by the display light has a first focal length in the first state, and the image formed by the display light has a second focal length in the second state.

10. The virtual reality display according to claim 9, wherein a switching frequency of the first state and the second state is greater than or equal to 240 Hz and less than or equal to 1000 Hz.

11. The virtual reality display according to claim 7, wherein the liquid crystal cell comprises a twisted nematic liquid crystal array.

* * * * *